(12) United States Patent
Abe et al.

(10) Patent No.: US 9,676,659 B2
(45) Date of Patent: *Jun. 13, 2017

(54) METHOD OF MANUFACTURING AN OPTICAL FIBER

(71) Applicant: SUMITOMO ELECTRIC INDUSTRIES, LTD., Osaka-shi, Osaka (JP)

(72) Inventors: Yuji Abe, Utsunomiya (JP); Ryutaro Miyazaki, Utsunomiya (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,072

(22) Filed: Aug. 28, 2015

(65) Prior Publication Data

US 2015/0368143 A1    Dec. 24, 2015

Related U.S. Application Data

(63) Continuation of application No. 13/911,372, filed on Jun. 6, 2013, now Pat. No. 9,169,151.

(30) Foreign Application Priority Data

Jun. 8, 2012  (JP) ................................. 2012-130931

(51) Int. Cl.
    *C03B 37/025* (2006.01)
    *C03B 37/027* (2006.01)

(52) U.S. Cl.
    CPC ........ *C03B 37/0253* (2013.01); *C03B 37/025* (2013.01); *C03B 37/02736* (2013.01); *C03B 37/02772* (2013.01); *C03B 2205/07* (2013.01); *C03B 2205/47* (2013.01)

(58) Field of Classification Search
    CPC ............. C03B 37/025–37/026; C03B 37/0272
    See application file for complete search history.

(56) References Cited

U.S. PATENT DOCUMENTS

| 4,104,355 | A | 8/1978 | Dunn et al. |
| 5,581,647 | A | 12/1996 | Onishi et al. |
| 5,672,192 | A | 9/1997 | Fleming, Jr. |
| 2005/0188728 | A1* | 9/2005 | Zhiou ............... C03B 37/02745 65/402 |

FOREIGN PATENT DOCUMENTS

| JP | 8-59278 A | 3/1996 |
| JP | 8-277139 A | 10/1996 |

* cited by examiner

*Primary Examiner* — Lisa Herring
(74) *Attorney, Agent, or Firm* — Drinker Biddle & Reath LLP

(57) ABSTRACT

A manufacturing method that enables stably making a high-quality optical fiber is provided. The manufacturing method of the present invention comprises: a softened portion falling step in which an optical fiber preform is heated in a heating furnace and a dropping part of softened portion of the preform thus heat-softened is allowed to drop; and a drawing step for drawing the preform such that the softened glass is drawn into a fiber by applying a tension with a take-up means after the softened portion falling step, whereas the preform is rotated about its axis at the softened portion falling step.

5 Claims, 7 Drawing Sheets

METHOD OF MANUFACTURING AN OPTICAL FIBER

This is a continuation application of copending application Ser. No. 13/911,372, having a filing date of Jun. 6, 2013. The copending application Ser. No. 13/911,372 is incorporated by reference herein in its entirety.

BACKGROUND OF THE INVENTION

Field of the Invention

The present invention relates to a method for making an optical fiber by drawing an optical fiber preform.

Description of the Background Art

An optical fiber can be made by a step of heating and softening a lower end side portion of a silica glass optical fiber preform (hereafter, also shortly called "preform"), and extending the softened portion by applying a tension so as to make a thin glass fiber and finally by a step of covering the circumference of the glass fiber with a resinous coating. Such step of making an optical fiber by reducing the diameter of a preform is called "drawing", and the optical fiber thus drawn is rolled around a bobbin on the downstream of a path line by means of a take-up means such as a capstan roller.

In the past, it has been difficult to make an optical fiber having a completely concentric circular cross-sectional form of core and cladding, and it has been a problem to be solved. If a core or a cladding has a cross-section which is an elliptic or distorted circular form, the refractive-index profile will not have axial symmetry. This will cause differences in the group velocity between two polarized waves which perpendicularly intersect, travelling through an optical fiber, and consequently the polarization mode dispersion will become large.

Japanese Patent Application Publication No. H8-277139 describes a method of drawing an optical fiber preform into a fiber while rotating the preform. According to the method, the lower end side of a preform is heated, and the softened lower end portion of the preform is allowed to fall as a "dropping part" by means of its own weight. Thereafter, the glass extended by falling of the dropping part is set to a path line leading to a capstan roller, and the preform is rotated at a given rotational speed while the line speed is being raised to a regular line speed, and the drawing of an optical fiber is commenced. However, even when the drawing was conducted while the preform was rotated, there were cases where an optical fiber thus made was substandard such that a core or cladding had an elliptic or distorted circular cross-section, or the core was nonconcentric.

SUMMARY OF THE INVENTION

Object of the Invention

The object of the present invention is to provide a manufacturing method which enables stably making a high-quality optical fiber.

Means for Achieving the Object

To achieve the object, the optical fiber manufacturing method comprises: (1) a softened portion falling step in which an optical fiber preform is heated in a heating furnace and a part of softened portion of the preform thus heat-softened is allowed to drop while the preform is rotating about its axis; and (2) a drawing step in which the preform is drawn into a fiber as a remaining part of the softened portion is extended by applying a tension.

At the drawing step in the optical fiber manufacturing method of the invention, an optical fiber preform may be rotated about its axis at a rotational speed that is lower than the preform rotational speed adopted at the softened portion falling step. The rotational speed of the optical fiber preform at the softened portion falling step may be 0.2 rpm or more. At the drawing step, the rotational speed of an optical fiber preform during the drawing of the upper end vicinity of the preform may be higher than the rotational speed of the preform during the drawing of the central portion of the preform. In such case, preferably the rotational speed of an optical fiber preform during the drawing of the upper-end vicinity of the preform is 0.2 rpm or more. The term "upper-end vicinity" as used herein means a part extending in a range of 30 cm from the upper end of an optical fiber preform.

Another aspect of the present invention is an optical fiber manufacturing method which includes a drawing step such that an optical fiber preform is softened by heating in a heating furnace and the softened portion of the preform is extended downward to draw the preform by applying a tension with a take-up means, and the preform is rotated about its axis during the drawing of the upper-end vicinity of the preform.

In such case, an optical fiber preform may be rotated about its axis during the drawing of the central portion thereof as well as during the drawing of the upper-end vicinity, the rotational speed of which may be higher than during the drawing of the central portion of the preform. Also, the rotational speed of the optical fiber preform during the drawing of the upper-end vicinity of an optical fiber preform may be 0.2 rpm or more. Preferably, the rotational speed of an optical fiber preform during the drawing of the upper-end vicinity of the preform is 0.2 rpm or more.

Effect of the Invention

With an optical fiber manufacturing method of the present invention, by heating an optical fiber preform in a heating furnace while rotating the preform about its axis at the softened portion falling step or by drawing the preform downward by applying a tension to the softened portion while rotating the preform about its axis during the drawing of the upper-end vicinity of the preform, it is possible to maintain the axial symmetry of the softened portion of the preform and accordingly to prevent the resultant optical fiber from having a substandard structure.

DETAILED DESCRIPTION OF THE INVENTION

In the following, an embodiment of the present invention will be described with reference to drawings. The drawings are provided for the purpose of explanation only and not intended to limit the scope of the invention. The dimensional ratio in a drawing is not necessarily exact.

Figure 1:
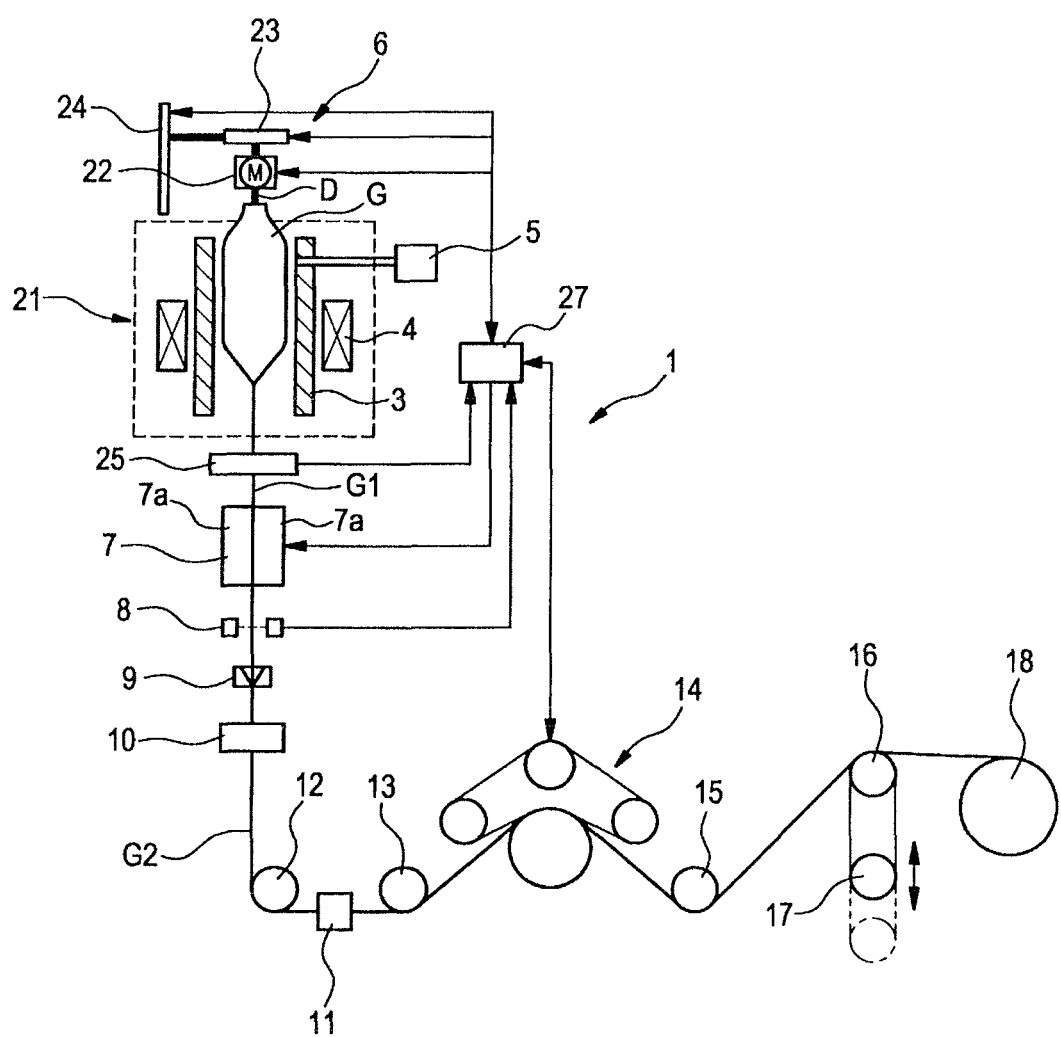
FIG. 1 is a conceptual diagram showing an embodiment of the present invention for manufacturing an optical fiber.

FIG. 1 is a conceptual diagram showing an embodiment of the present invention for an optical fiber manufacturing method. The equipment 1 for manufacturing an optical fiber has a heating furnace 21 for heating an optical fiber preform G on the upper-most side. The heating furnace 21 includes a cylindrical furnace muffle 3 into which the preform G is supplied and a heating means 4 surrounding the furnace muffle 3, so that a heating region for softening the preform G with the heating means 4 is formed. The heating furnace 21 has a gas supply section 5 for supplying a purge gas to the heating region.

The upper part of the optical fiber preform G is connected to a holding rod D, which is held by the holding structure 6, and consequently the preform G is supported in the equipment 1. The preform G is supplied into the heating furnace 21 so that the lower end portion thereof may be located in the heating region inside the furnace muffle 3, and extended downward by drawing, whereby the diameter is reduced to make a glass fiber G1. The holding structure 6 includes: a rotational mechanism 22 for gripping the holding rod D so as to make the optical fiber preform G rotate about its axis; a horizontal transfer mechanism 23 for moving the rotational mechanism 22 in a horizontal direction which perpendicularly intersects with the rotational axis; and a feeder 24 for causing the preform G to move downward in accordance with a progress of drawing.

A fiber-position monitor 25 is provided on the downstream side of the heating furnace 21, and the fiber-position monitor 25 detects the horizontal position of a glass fiber G1 drawn from the optical fiber preform G. A cooling device 7 using a coolant gas, such as helium gas, is provided on the downstream side of the fiber-position monitor 25, whereby the glass fiber G1 is cooled. The cooling device 7 has a split-half structure including a pair of split-half cylinders 7a capable of opening and closing, and cools the glass fiber G1 in a closed state where the split-half cylinders 7a abut against each other.

The glass fiber G1 which has come out of the cooling device 7 is measured with respect to its outer diameter by a laser-type cladding-diameter monitor 8, for example. The outer diameter of the glass fiber G1 is 125 µm, for example.

On the downstream side of the cladding-diameter monitor 8, there are a die 9 for applying an ultraviolet curable resin to the glass fiber G1 and ultraviolet-irradiation equipment 10 for curing the ultraviolet curable resin thus applied, which are arranged in order. The glass fiber G1 which has passed through the die 9 and the ultraviolet irradiation equipment 10 are covered with a coating layer made of ultraviolet curable resin, and thereby an optical fiber G2 is formed. As for the ultraviolet curable resin, for example, a urethane acrylate resin is used. The outer diameter of the optical fiber G2 is 250 µm, for example.

The optical fiber G2 which has passed through the ultraviolet irradiation equipment 10 is set on a downward guide roller 12 which is provided below the heating furnace 21, and the running direction thereof is changed by the downward guide roller 12. And, the optical fiber G2 whose running direction has been changed by the downward guide roller 12 is monitored in terms of the coating layer by inspection equipment 11. The inspection equipment 11 monitors an occurrence of defect by optically (e.g., by laser) detecting any existence of air bubbles in the coating layer of the optical fiber G2, the outer diameter of the coating layer, or existence of unevenness of the coating layer. A guide roller 13 is provided on the downstream side of the inspection equipment 11, and the running of the optical fiber G2 to be inspected by the inspection equipment 11 is guided by the downward guide roller 12 and the guide roller 13.

The optical fiber G2 which has passed through the guide roller 13 is taken up by a capstan roller 14 (an example of take-up means) so that it is sent to a take-up bobbin 18 through a screening device 15 and the dancer rollers 16 and 17, and finally wound on the take-up bobbin 18.

Equipment 1 for making an optical fiber has a control part 27. The control part 27 is connected, in a manner enabling communications, to the rotational mechanism 22, the horizontal transfer mechanism 23, the feeder 24, the fiber-position monitor 25, the cladding-diameter monitor 8, the inspection equipment 11, the capstan roller 14, etc. The control part 27 controls the rotational mechanism 22, the horizontal transfer mechanism 23, and the feeder 24 on the basis of detected signals from the fiber-position monitor 25, the cladding-diameter monitor 8, etc.

In the following, an explanation about an example of method for manufacturing an optical fiber with the Equipment 1 will be given. First, an optical fiber preform G is introduced into the heating furnace 21, and the lower end (i.e., end for starting the drawing) of the preform G is heated with the heating means 4. During such heating, the preform G is rotated by the rotational mechanism 22 with a given rotational speed (for example, at a rate of one round for about 5 minutes).

When the optical fiber preform G is continuously heated while it is rotated, the lower end portion of the preform G will soften and a lump (i.e., dropping part) of the softened portion will fall below by its own weight. The process described so far is an example of the softened portion falling step of the present invention.

After the lump of a softened portion has fallen, the glass thus extended is set on a path line to the capstan roller 14, and while the line speed is raised to a regular line speed, the optical fiber preform G is rotated at a given rotational speed (for example, at a rate of one round for about 10 minutes) lower than that of the softened portion falling step. Thus, the drawing of the optical fiber G2 is commenced. The process subsequent to this process is an example of the drawing step of the present invention.

When the line speed is increased to a suitable line speed after the start of drawing, the control part 27 will close the cooling device 7 and start cooling of the optical fiber G1. Then, an ultraviolet curable resin is applied by the die 9 to the periphery of the glass fiber G1 upon drawing, and the ultraviolet curable resin is cured by irradiation of ultraviolet rays from the ultraviolet irradiation equipment 10, whereby a resin-coated optical fiber G2 is obtained.

Thereafter, the drawing of the glass fiber G1 is done at a manufacturing line speed V for regular manufacture while the position of the glass fiber G1 is adjusted by the horizontal transfer mechanism 23. The manufacturing line speed V is 1600 m/min, for example.

The running direction of the resin-coated optical fiber G2 is changed by the downward guide roller 12 to guide to the inspection equipment 11. And, by passing the optical fiber G2 through the inspection equipment 11, the inspection is optically done by the inspection equipment 11 with respect to its form such as existence of air bubbles, outer diameter of the coating layer, or existence of unevenness in the coating layer. Upon such inspection regarding its form, the optical fiber G2 is led to the capstan roller 14 by the guide roller 13, and the optical fiber G2 is taken up by the capstan roller 14 so as to be afforded with a predetermined tension, and then wound up on the take-up bobbin 18 through the screening device 15 and the dancer rollers 16 and 17.

According to this example of embodiment, after the drawing of the central portion of the optical fiber preform G is completed upon elapse of a given time from the start of drawing, the speed of axial rotation of the preform G is raised again (for example, to a rate of one round for about 5 minutes), and the drawing from the upper-end (i.e., the end where the drawing has been completed) vicinity of the preform G is continued. The term "central portion of the preform G" as used herein means a portion (effective portion) which can be stably drawn into an optical fiber that is usable as a product. The lower-end portion of the preform G is a portion at which the preform G introduced into the heating furnace 21 is heated first. The "upper-end vicinity" means a part extending in a range of 30 cm from the upper end of an optical fiber preform.

As described above, in this embodiment, an optical fiber preform G is rotated about its axis by the rotational mechanism 22, for example, at a rotational speed of about 0.2 rpm, commencing from the time when the preform G is introduced into the heating furnace 21, heated, and softened, that is, from the time when a dropping part is allowed to fall before the drawing step is started. Thereafter, before the drawing of the central portion of the preform G is commenced, the rotational speed of the preform is reduced approximately by half to about 0.1 rpm, and then the drawing is started. Before the drawing from the central portion of the preform G is completed, the rotational speed of the preform G is increased to about 0.2 rpm again, and then the drawing of the upper-end vicinity of the preform G is done.

Generally, the unsintered portion which remains in the upper end portion of an optical fiber preform G tends to have an asymmetrical form, and the lower end portion also easily becomes asymmetrical. Such an asymmetrical portion causes deviation of thermal profile on the preform G at the time of heating. If the thermal profile on the preform G has deviation, the substantially cone-shaped lower end portion of the preform G (hereinafter, sometimes called "neck down part") which exists after a dropping part has fallen from the end portion of the preform G will become less symmetrical. Thus, when a neck down part has an asymmetrical form, the drawing will be done in a state where deviation of thermal profile remains for a while, if the preform is rotated thereafter. Consequently, an optical fiber G2 obtained by drawing the central portion of the preform will have a non-circular diameter or a nonconcentric core, which can be a cause of substandard structure.

In this embodiment, therefore, an optical fiber preform G is rotated from the time when the preform G is introduced into the heating furnace 21 and heated to soften, that is, from the time when a dropping part is allowed to fall before commencement of the drawing step. This enables uniformly heating the lower end portion of the preform G including an asymmetrical portion and thereby suppressing deviation of the thermal profile of the softened portion of the preform G. Thus, suppressing the deviation of thermal profile helps to prevent a neck down part from having an asymmetrical form and enables stable production of an optical fiber G2 hardly having substandard structure.

In this embodiment, the rotational speed of an optical fiber preform G at the time of allowing a dropping part to fall is set to be about twice the rotational speed of the preform G at the time of drawing the central portion of the preform G. Specifically, the rotational speed of the preform G at the time of falling of the dropping part is about 0.2 rpm, and the rotational speed of the preform G at the time of drawing the central portion of the preform G is set to about 0.1 rpm. Setting the rotational speed in this manner makes it possible to effectively restrain deviation of form with respect to circumferential and lineal directions of a neck down part.

In this embodiment, the rotational speed of the preform G at the time of drawing the upper-end vicinity the optical fiber preform G is, for example, about twice the rotational speed of the preform G at the time of drawing the central portion of the preform G. More specifically, the rotational speed of the preform G at the time of drawing the upper-end vicinity of the preform G is about 0.2 rpm, and the rotational speed of the preform G at the time of drawing the central portion of the preform G is set to about 0.1 rpm. Since the preform G tends to have an unsintered or asymmetrically shaped portion at its upper-end vicinity as well as its lower end portion, the occurrence of deviation of thermal profile at the softened portion of the preform G is suppressed by setting the rotational speed as mentioned above and uniformly heating the upper-end vicinity of the preform G. By suppressing the deviation of thermal profile, it will be made possible to suppress a neck down part from having an asymmetrical form, thereby enabling stable manufacture of an optical fiber G2 having no substandard structure.

In addition, by setting the rotational speed at the time of falling of a dropping part of an optical fiber preform G and the rotational speed at the time of drawing of the upper-end vicinity of the preform G in a manner as mentioned above, it will be made possible to draw an optical fiber having no substandard structure from the lower-end portion or upper-end vicinity of the preform G, which would tend to contain an unsintered or asymmetrical portion.

In the embodiment mentioned above, the explanation is given with respect to an example in which the drawing of an optical fiber preform G is conducted while the preform G is rotated with the rotational speed changing from the time of falling of the dropping part to the time of ending the drawing of upper-end vicinity of the preform G. However, the present invention is not limited to such example. For example, the preform G may be rotated only at the softened portion falling step where a dropping part is allowed to fall. Even with such a manner, it will be possible to uniformly heat an asymmetrical portion in the lower end portion of the preform G and to control the deviation of thermal profile of the softened portion of the preform G. Accordingly, it is possible to suppress a neck down part from having an asymmetrical form and to stably produce an optical fiber G2 having no substandard structure.

Also, an optical fiber preform G may be rotated only when the drawing of the upper-end vicinity of the preform G is conducted. Even with such a manner, it is possible to uniformly heat the unsintered or asymmetrical portion contained in the upper-end vicinity of the preform G, so that the deviation of the thermal profile in the softened portion of the preform G can be suppressed. Therefore, it is possible to suppress a neck down part from having an asymmetrical form and to stably produce an optical fiber G2 having no substandard structure.

Figure 2:
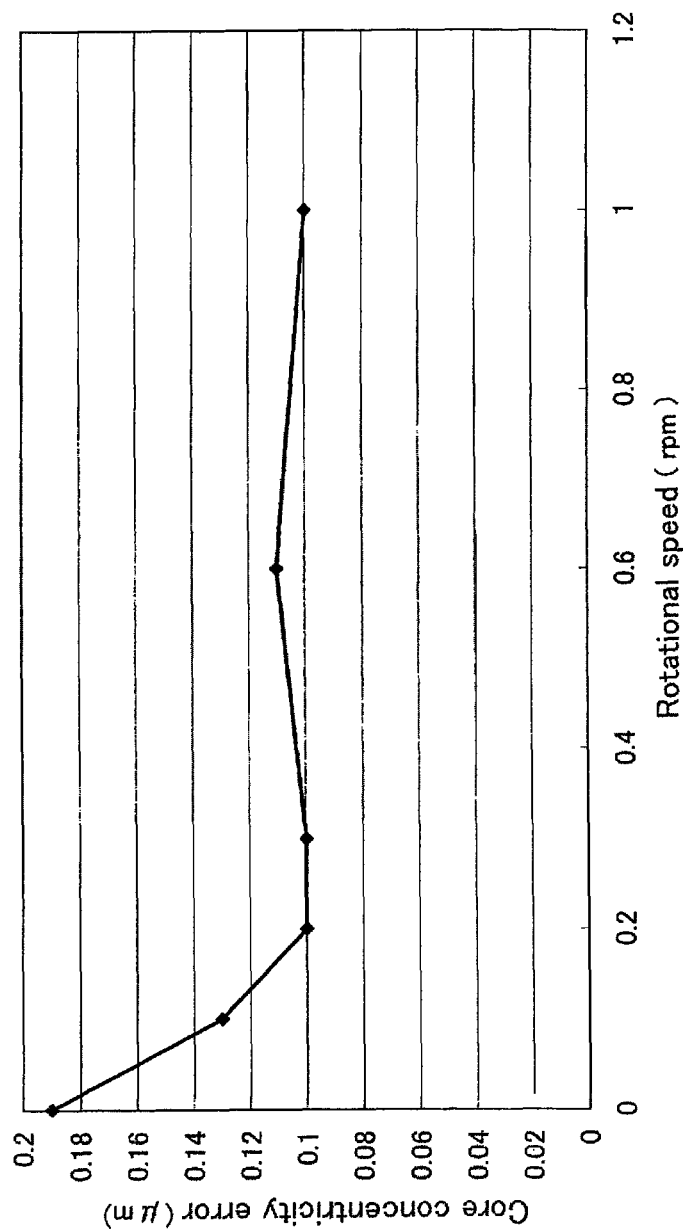
FIG. 2 is a graph showing a relationship between the core concentricity error of an optical fiber as obtained by drawing a lower end portion of an optical fiber preform and the rotational speed of the preform when the dropping part is allowed to fall.
Figure 3:
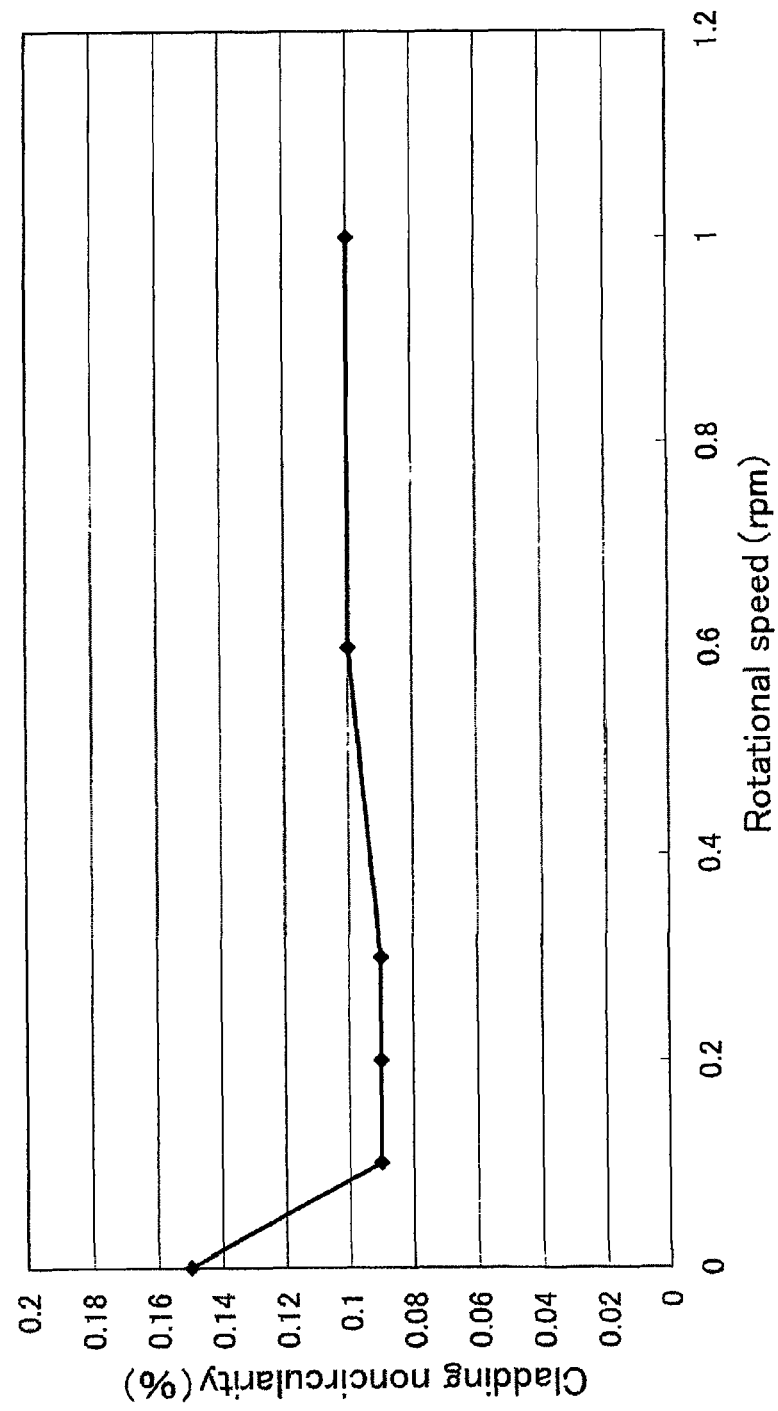
FIG. 3 is a graph showing a relationship between the cladding non-circularity of an optical fiber as obtained by drawing a lower end portion of the preform and the rotational speed of the preform when the dropping part is allowed to fall.

In the following, we will describe experiments which we conducted in order to confirm the effect of the present invention. FIG. 2 shows a relationship between the core concentricity error of an optical fiber as obtained by drawing a lower end portion of an optical fiber preform after falling of a dropping part thereof and the rotational speed of the preform when the dropping part is allowed to fall. FIG. 3 shows a relationship between the cladding non-circularity of an optical fiber as obtained by drawing a lower end portion of an optical fiber preform after falling of a dropping part thereof and the rotational speed of the preform when the dropping part is allowed to fall. In both cases, the rotational speed of the preforms after falling of a dropping part is 0.1 rpm. The core concentricity error is a distance between the center of a core and the center of a cladding. The cladding non-circularity is a percentage obtained when the difference between the major axis and the minor axis of a cross-section of an optical fiber is divided by an average value of the major axis and the minor axis, and hence the smaller the percentage, the cladding is the closer to a perfect circle.

As shown in FIGS. 2 and 3, in the case where an optical fiber preform was not rotated when a dropping part thereof is allowed to fall, the core concentricity error of the optical fiber drawn from the lower end portion of the preform was 0.19 μm, and the cladding non-circularity was 0.15%. On the other hand, in the case where the preform was rotated at a rotational speed of 0.1 rpm from before falling of a dropping part, the resultant optical fiber had a core concentricity error of 0.13 μm and a cladding non-circularity of 0.09%. Thus, the core concentricity error and the cladding non-circularity were both smaller as compared with the case where the preform was not rotated.

Also, in the case where the optical fiber preform was rotated at a rotational speed of 0.2 rpm from the time of falling of the dropping part, the core concentricity error of the resultant optical fiber was more reduced to 0.10 μm. As can be seen in FIGS. 2 and 3, no significant changes were recognized with respect to the core concentricity error or cladding non-circularity even if the rotational speed was increased to more than 0.2 rpm. Therefore, it may be said that by setting the rotational speed to at least 0.2 rpm or more, the core concentricity error and the cladding non-circularity can be restrained to such a low level as not to correspond to substandard structure.

Figure 4:
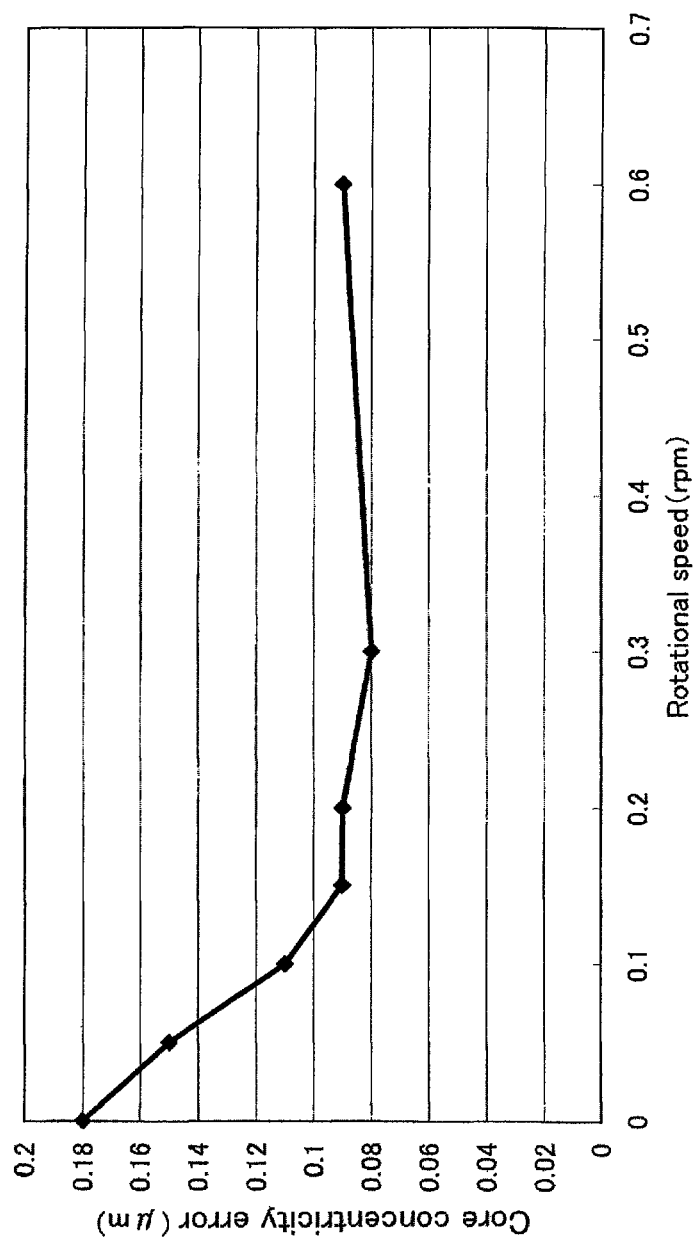
FIG. 4 is a graph showing a relationship between the core concentricity error of an optical fiber as obtained by drawing the upper-end vicinity of an optical fiber preform and the rotational speed of the preform at that time.
Figure 5:
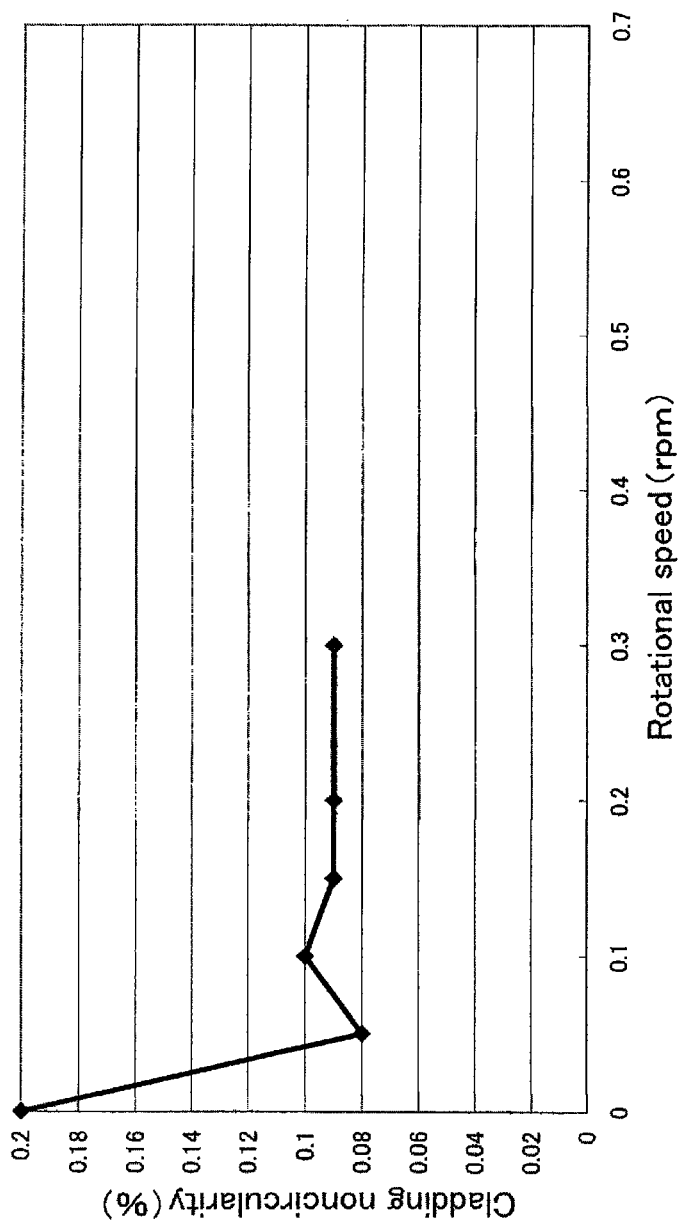
FIG. 5 is a graph showing a relationship between the cladding non-circularity of an optical fiber as obtained by drawing the upper-end vicinity of an optical fiber preform and the rotational speed of the preform at that time.

FIG. 4 shows a relationship between the core concentricity error of an optical fiber as obtained by drawing the upper-end vicinity of a preform thereof and the rotational speed of the preform at that time. FIG. 5 shows a relationship between the cladding non-circularity of an optical fiber as obtained by drawing the upper-end vicinity of a preform thereof and the rotational speed of the preform at that time. In the case where a preform was not rotated, the core concentricity error of an optical fiber drawn from the portion upper-end vicinity of the preform was 0.18 μm, and the cladding non-circularity was 0.2%. On the other hand, in the case where the preform was rotated at a rotational speed of 0.05 rpm, the core concentricity error of the resultant optical fiber was 0.15 μm and the cladding non-circularity was 0.08%, and both the core concentricity error and the cladding non-circularity were small as compared with the case where the preform was not rotated.

Also, in the case where an optical fiber preform was rotated at a rotational speed of 0.10 rpm, the core concentricity error of the resultant optical fiber was 0.11 μm; the core concentricity error was thus reduced. Furthermore, in the case where a preform was rotated at a rotational speed of 0.2 rpm, the core concentricity error of the resultant optical fiber was 0.09 μm, and the cladding non-circularity was 0.09%; and thus the core concentricity error was further reduced. However, as shown in FIGS. 4 and 5, even if the rotational speed was increased to more than 0.2 rpm, there were no recognizable significant changes in the core concentricity error or the cladding non-circularity. Therefore, it may be said that by setting the rotational speed to at least 0.2 rpm or more, the core concentricity error and the cladding non-circularity can be restrained to such a low level as not to correspond to substandard structure.

Figure 6:
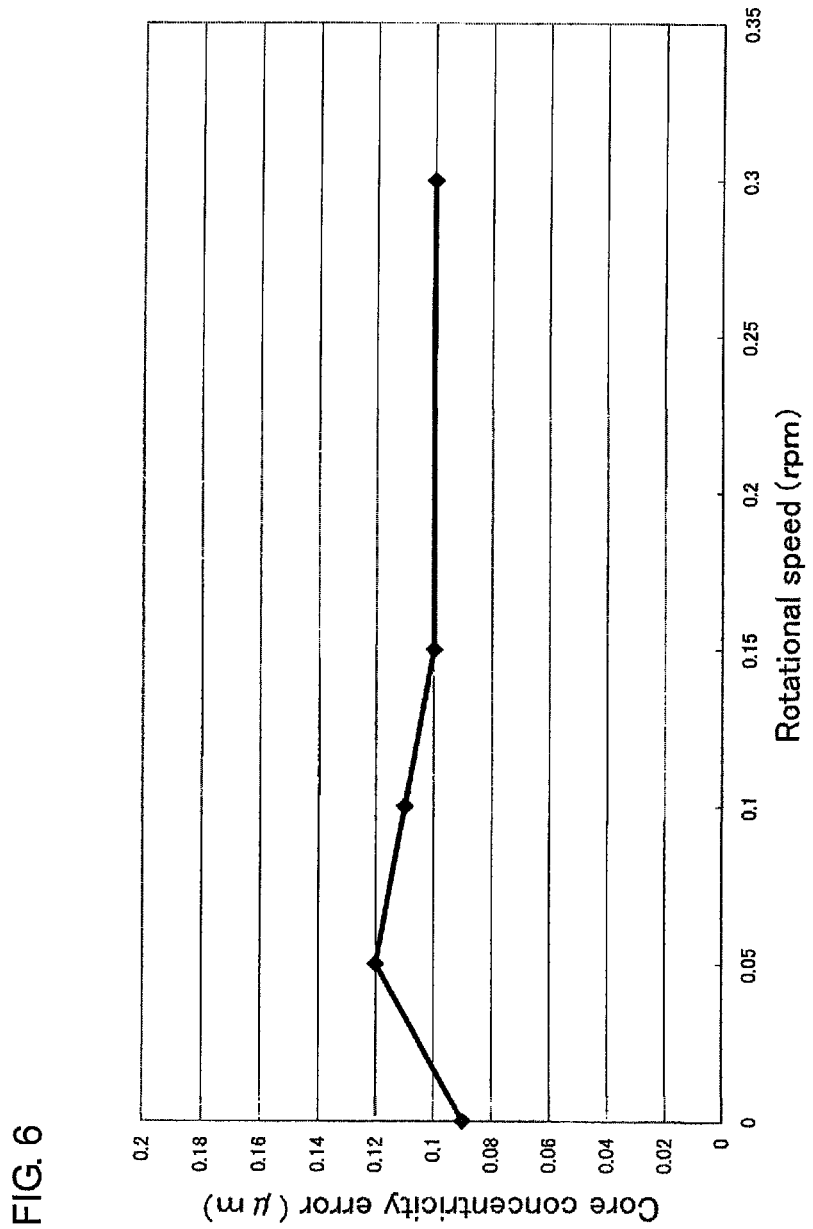
FIG. 6 is a graph showing a relationship between the core concentricity error of an optical fiber as obtained by drawing the central portion of an optical fiber preform and the rotational speed of the preform at that time.
Figure 7:
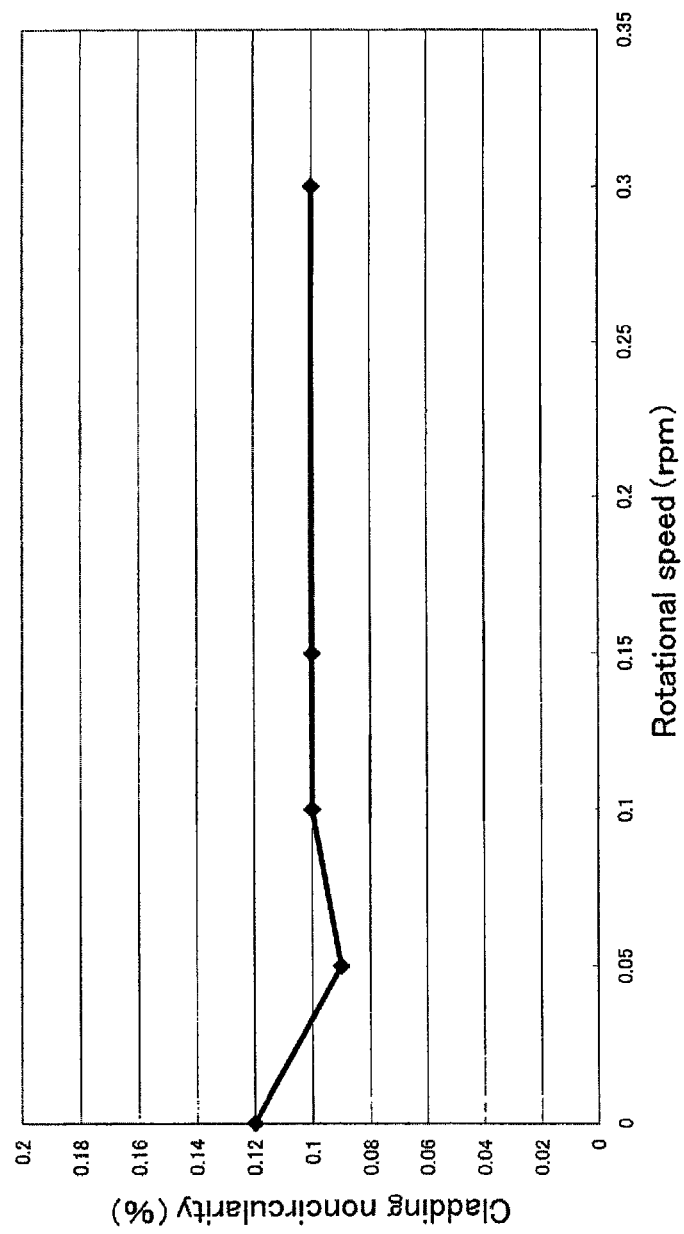
FIG. 7 is a graph showing a relationship between the cladding non-circularity of an optical fiber as obtained by drawing the central portion of an optical fiber preform and the rotational speed of the preform at that time.

FIG. 6 shows a relationship between the core concentricity error of an optical fiber as obtained by drawing the central portion of a preform thereof and the rotational speed of the preform at that time. FIG. 7 shows a relationship between the cladding non-circularity of an optical fiber as obtained by drawing the central portion of a preform thereof and the rotational speed of the preform at that time. In this case, the preform was rotated at 0.2 rpm when a dropping part fell, and thereafter at the time of drawing of the central portion, the rotational speed was change to those shown in FIGS. 6 and 7.

As shown in FIG. 6 and FIG. 7, when an optical fiber preform was not rotated, the core concentricity error of the optical fiber drawn from the central portion of the preform was 0.09 μm and the cladding non-circularity was 0.12%. In the case of drawing the central portion, even if the rotational speed of the preform was changed to 0.05 rpm, 0.1 rpm, and 0.3 rpm, no significant changes were recognized with respect to the core concentricity error and the cladding non-circularity, although they were improved a little as compared with the case where no rotation was performed. Presumably, this is because the drawing was stably accomplished without causing thermal deviation since the preform was rotated at the time of falling of the dropping part.

From the results of the above experiments, it was found that when the rotational speed of an optical fiber preform is set to 0.2 rpm, 0.1 rpm, and 0.2 rpm, respectively at the time of falling of a dropping part thereof, at the time of drawing from the central portion thereof, and at the time of drawing from the upper-end vicinity thereof, a high-quality optical fiber is stably obtained from the preform as a whole by restraining the core concentricity error and the cladding non-circularity to such a low level as does not correspond to a substandard structure. It is advisable that the rotational speed should not be excessively increased (though thereby the core concentricity error or the cladding non-circularity might be satisfactory), since if the rotational speed is set larger than those mentioned above, other problems will arise such that the measuring range might become out of scope of the cladding-diameter monitor, or irregularities of the cladding outer diameter or the covering outer diameter might occur. Therefore, in view of over-all consideration including such problems, the minimum rotational speed for decreasing the core concentricity error and the cladding non-circularity is preferably about 0.1 rpm for a central portion, and for lower end and upper end portions, the rotational speed is higher than the central portion, preferably about 0.2 rpm.

As described above, explanation of the present invention was given in detail with reference to specific embodiments. To a person skilled in the art, however, it is obvious that various alternation and modification can be made within the scope of the invention.

What is claimed is:

1. An optical fiber manufacturing method comprising:
   a softened portion falling step, wherein an optical fiber preform is heated in a heating furnace and a part of a softened portion of the preform thus heat-softened is allowed to drop while the preform is rotating about its axis at a rotational speed of 1 rpm or less; and
   a drawing step, wherein the preform is drawn into a fiber as a remaining part of the softened portion is extended by applying a tension, while the optical fiber preform is rotated about its axis at a rotational speed lower than the preform rotational speed adopted at the softened portion falling step.

2. An optical fiber manufacturing method according to claim 1, wherein
   at the drawing step, the preform rotational speed during the drawing of an upper-end vicinity of the preform is higher than the preform rotational speed adopted during the drawing of the central portion of the preform.

3. An optical fiber manufacturing method according to claim 2, wherein
   the preform rotational speed during the drawing of the upper-end vicinity of the preform is 0.2 rpm or more.

4. An optical fiber manufacturing method comprising a drawing step, wherein
   an optical fiber preform is softened by heating in a heating furnace and the softened portion is extended downward to draw the preform by applying a tension with a take-up portion, and wherein the preform is rotated about its axis at a rotational speed of 0.6 rpm or less during the drawing of an upper-end vicinity of the preform, wherein
   the preform is rotated about its axis during the drawing of a central portion of the preform, and the rotational speed of the preform during the drawing of the upper-end vicinity of the preform is higher than the preform rotational speed adopted during the drawing of the central portion of the preform.

5. An optical fiber manufacturing method according to claim 4, wherein
   the preform rotational speed during the drawing of the upper-end vicinity of the preform is 0.2 rpm or more.

* * * * *